June 22, 1937. G. MAIURI 2,084,403
PRODUCTION OF SOLID CARBON DIOXIDE
Original Filed Dec. 3, 1934
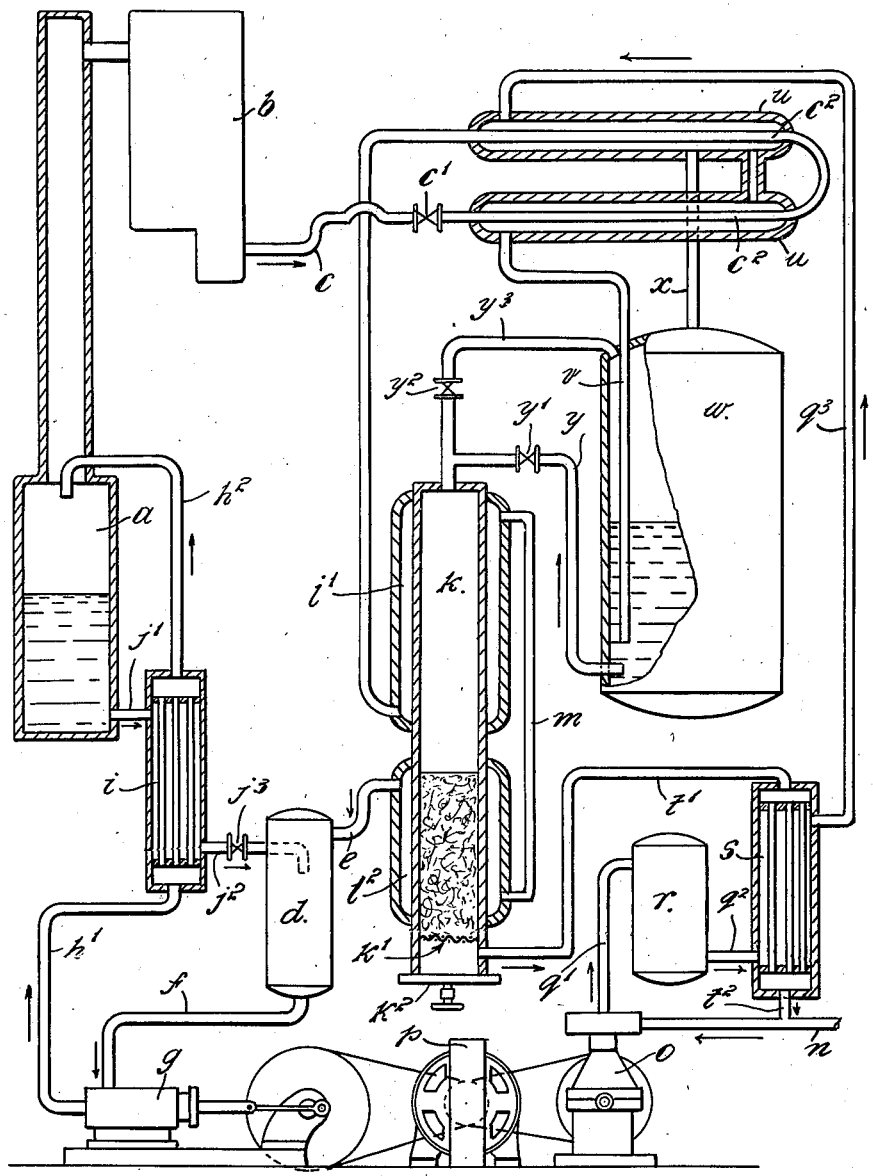
Inventor:
GUIDO MAIURI
BY: Francis E. Boyce
ATTORNEY Patented June 22, 1937

2,084,403

UNITED STATES PATENT OFFICE 2,084,403

PRODUCTION OF SOLID CARBON DIOXIDE

Guido Maiuri, Aldwych, London, England, assignor to Maiuri Refrigeration Patents Limited, London, England Original application December 3, 1934, Serial No. 755,754. Divided and this application June 23, 1936, Serial No. 86,771. In Great Britain June 6, 1934

2 Claims. (Cl. 62—121)

This invention relates to the production of solid carbon dioxide, and its object is to cause carbon dioxide to freeze into dense blocks, the present application being a division of my copending application, Serial No. 755,754, filed December 3, 1934.

It has already been proposed to produce dense blocks of solid carbon dioxide by forming carbon dioxide snow by the expansion in a chamber of liquid carbon dioxide, the snow being supported on a sieve beneath which carbon dioxide gas is drawn off to cause liquid carbon dioxide to permeate and render the snow dense.

According to the present invention, liquid carbon dioxide at low pressure is cooled to a solidifying temperature in a mould cooled by an evaporating refrigerating agent, whilst the liquid carbon dioxide is subjected to pressure conditions permitting evaporation therefrom. Thus the low pressure liquid carbon dioxide is subjected to the combined cooling effects of the evaporating refrigerating agent and of evaporating carbon dioxide.

An installation for carrying out the invention is illustrated on the accompanying drawing, which shows the installation in diagrammatic sectional elevation.

$a$ is the boiler of an absorption refrigerating machine. $b$ is the condenser thereof, in which a refrigerant such as ammonia is liquefied and from which it is supplied by a pipe $c$, having an expansion valve $c^1$, to the evaporator, in the present instance a coil $c^2$ and jackets surrounding a mould as will be described later. $d$ is the absorber of the refrigerating machine to which the evaporated refrigerant passes by a pipe $e$. From the absorber $d$ enriched absorption liquor is withdrawn along a pipe $f$ by a pump $g$, which delivers it to the boiler $a$ by a pipe $h^1$, a heat-exchanger $i$, and a pipe $h^2$. Weak liquor is forced by the boiler pressure along a pipe $j^1$, the heat-exchanger $i$ and a pipe $j^2$ to the absorber $d$, past a pressure-reducing valve $j^3$.

$k$ is a mould surrounded by two superposed jackets $l^1$, $l^2$, constituting part of the evaporator of the refrigerating machine. Liquid refrigerant is supplied from the condenser $b$, by the pipe $c$ and coil $c^2$ to the bottom of the upper jacket $l^1$. The top of the upper jacket $l^1$ is connected by a pipe $m$ to the bottom of the lower jacket $l^2$. The top of the lower jacket $l^2$ is connected to the absorber $d$ by the already-mentioned pipe $e$.

Carbon dioxide gas from any suitable source arrives by a pipe $n$, and is compressed by a single-stage compressor $o$ to a pressure slightly above the triple point pressure, for instance 7 atmospheres absolute.

The compressor $o$ is driven by an electromotor $p$ which also drives the pump $g$.

The compressed carbon dioxide gas passes by a pipe $q^1$ to a cooler $r$ wherein it is cooled to atmospheric temperature. From the cooler $r$ the compressed carbon dioxide passes by a pipe $q^2$ to a heat-exchanger $s$, and thence by a pipe $q^3$ into a series of jackets $u$. These jackets $u$ jacket the pipe coil $c^2$, connected between the expansion valve $c^1$ of the liquid ammonia supply pipe $c$ and the upper jacket $l^1$ of the mould $k$. The pressure conditions in the coil $c^2$ are such that the carbon dioxide in the jackets $u$ is subjected to a liquefying temperature and becomes condensed therein. The liquid carbon dioxide drains by a pipe $v$ into a tank $w$ wherein it is stored. The pipe $v$ extends to near the bottom of the tank $w$ so as to be sealed by the stored liquid carbon dioxide. The top of the tank $w$ is vented by a pipe $x$ into the jackets $u$.

Liquid carbon dioxide from the storage tank $w$ is forced by the pressure along a pipe $y$, having a stop cock $y^1$, into the top of the mould $k$.

From the bottom of the mould $k$ and beneath a perforated false bottom or partition $k^1$ permeable to gas but not to liquid, a pipe $t^1$ leads to the heat-exchanger $s$ which is connected by a pipe $t^2$ to the gas supply pipe $n$ and consequently also to the suction of the compressor $o$.

The sub-atmospheric pressure in the absorber $d$ is arranged to be so low that the refrigerant in the jackets $l^1$, $l^2$, evaporates at temperatures such as to maintain the internal surface of the mould at temperatures which decrease downwards from slightly above the triple point temperature of carbon dioxide at the top to slightly below the triple point temperature of carbon dioxide at the bottom. These differences of temperatures in the jackets and mould are obtained by the liquid refrigerant in the upper jacket $l^1$ evaporating against the static pressure head of the liquid refrigerant in the lower jacket $l^2$.

Owing to the temperatures reigning in the mould $k$, the liquid carbon dioxide entering the mould $k$ by the pipe $y$, flows down the mould and solidifies on the perforated false bottom $k$, the apertures of which are covered with gauze impermeable, owing to surface tension, by liquid carbon dioxide although permeable to gaseous carbon dioxide. At the same time the suction exerted by the compressor $o$ on the space beneath the false bottom $k^1$ of the mould causes some of the carbon dioxide to evaporate and thereby exert an additional cooling effect on the remainder within the mould.

The reduced pressure beneath the false bottom $k^1$ not only will induce evaporation of some of the carbon dioxide and so assist in freezing the remainder, but will also draw liquid carbon dioxide into any interstices in the block of solid carbon dioxide to freeze therein, thus promoting continuity of the dense structure of the block.

The mould $k$ is partially filled with liquid carbon dioxide from the tank $w$, and, after closing the stop cock $y^1$ in the pipe $y$ which leads from the bottom of the tank, the mould is placed in communication with the top of the tank $w$ by opening a stop cock $y^2$ in a pipe $y^3$ interconnecting the upper portions of the tank and mould. The gaseous carbon dioxide thus admitted to the mould liquefies and fills interstices in the solid carbon dioxide due to shrinkage of the liquefied carbon dioxide on solidifying.

The block of carbon dioxide ice is removed from the mould $k$ on removing a bottom cover $k^2$ and the false bottom $k^1$.

The freezing of carbon dioxide by the evaporation of the refrigerant accompanied by expansion of some of the liquid carbon dioxide, is more economical in carbon dioxide and in motive power for re-compression thereof than the known method of internal cooling by expansion of liquid carbon dioxide and utilizing for external cooling the sensible cold of the produced carbon dioxide gas, for in the former case the evaporating refrigerant exerts an energetic cooling effect equal to ¾ of the total of that required, whereas in the latter case the external cooling hardly compensates for the inward leakage of heat through the usual heat insulation.

I claim:

1. A method of producing dense solid carbon dioxide in a mould, consisting in cooling the upper portion of said mould to a temperature slightly above and the lower portion of said mould to a temperature below the triple point temperature of carbon dioxide, partially filling said mould with liquid carbon dioxide, applying suction to the under surface of said carbon dioxide in said mould, and admitting gaseous carbon dioxide at slightly above the triple point pressure of carbon dioxide into said mould above said liquid carbon dioxide until said liquid carbon dioxide in said mold is frozen.

2. A method of producing dense solid carbon dioxide in a mould, consisting in cooling said mould by evaporating a liquid refrigerant under a plurality of slightly different pressures causing the temperatures of said mould to decrease downwards from slightly above to below the triple point temperature of carbon dioxide, partially filling said mould with liquid carbon dioxide, applying suction to the under surface of said carbon dioxide in said mould, and admitting gaseous carbon dioxide at slightly above the triple point pressure of carbon dioxide into said mould above said liquid carbon dioxide until said liquid carbon dioxide in said mould is frozen.

GUIDO MAIURI.